March 25, 1969 M. J. PALLADINO 3,435,132

REFERENCE WAVE GENERATOR FOR A COLOR TELEVISION RECEIVER

Filed Feb. 18, 1966 Sheet 1 of 3

INVENTOR:
MICHAEL J. PALLADINO,

BY Donald N. Tinchie
HIS ATTORNEY.

REFERENCE WAVE GENERATOR FOR A COLOR TELEVISION RECEIVER

Filed Feb. 18, 1966 Sheet 2 of 3

INVENTOR:
MICHAEL J. PALLADINO,

BY Donald N. Timbie
HIS ATTORNEY.

INVENTOR:
MICHAEL J. PALLADINO
BY Donald R. Tinlie
HIS ATTORNEY.

United States Patent Office 3,435,132
Patented Mar. 25, 1969

3,435,132
REFERENCE WAVE GENERATOR FOR A COLOR TELEVISION RECEIVER

Michael J. Palladino, North Syracuse, N.Y., assignor to General Electric Company, a corporation of New York
Filed Feb. 18, 1966, Ser. No. 528,545
Int. Cl. H04n 5/38, 5/44
U.S. Cl. 178—5.4 3 Claims

ABSTRACT OF THE DISCLOSURE

A subcarrier reference signal supply for a color television receiver providing reference signals on three phase axes from a source signal occurring on a single phase axis. Signals along two phase axes are provided through two transformers, one of which may be tuned to provide a phase shift with respect to the other. A signal along a third phase axis is provided by combining portions of the signals occurring along the first two phase axes by means of tertiary windings on the two transformers.

This invention relates to improved means for deriving differently phased reference waves for application to the chroma detectors of a color television receiver.

The invention will be described in connection with a color television receiver designed for reproducing images from signals transmitted in accordance with the standards presently approved by the F.C.C. of the United States of America for color television transmission, but it is to be understood that the principles could apply to certain other color television systems as well.

In this system two different phases of a subcarrier are modulated in amplitude in accordance with the amplitude of different color information, the 0° phase with B—Y information and the 90° phase with R—Y information. The Y portion of these signals is comprised of the three color signals, R, G, and B in different proportions. The resulting sidebands are combined so as to form a chroma signal before being applied so as to amplitude modulate the main carrier. The circuits are so devised that the subcarrier itself is not mixed with the sidebands. However, in view of the fact that the color information represented by the sidebands depends on their phase relationship to the subcarrier, it is obvious that it must be transmitted. This is accomplished by sending several cycles of a predetermined phase of the subcarrier during the intervals between the line synchronizing pulses and the ensuing video signals. At a receiver, the subcarrier is effectively reconstituted either directly from the bursts or indirectly under their control.

The B—Y information may be recovered by sampling the chroma signal with a 0° phase of the reconstituted subcarrier, and the R—Y information may be recovered by sampling it with a 90° phase of the reconstituted subcarrier. Devices for performing this function are called synchronous detectors.

The R—Y and B—Y signals thus recovered are usually matrixed to derive a signal corresponding to G—Y. These signals are respectively applied to different electron guns of a cathode ray tube so as to aid in producing an image in color. In some receivers phases of subcarrier other than 0° and 90° are employed, but the same end result is attained by using rather complicated cross feeding arrangements.

Because of the fact that the Y component contains green information, vector analysis shows that the G—Y signal, although not separately derived at the transmitter, is represented by the chroma signal at the 237° phase of the subcarrier. Hence it can be recovered directly at the receiver by sampling the chroma signal with a reconstituted subcarrier having a phase of 237°. The reason for not having previously designed a color television receiver that operates in this manner lies in the cost of achieving reliable operation. Delay lines could be used, but they are expensive. Relatively low cost tuned circuits could be used, but when it is necessary to provide three phases of the reconstituted subcarrier wave, at least two of which differ by angles other than 90°, an interaction takes place which makes adjustment difficult and reliability of operation questionable.

It is sometimes desirable to use what are known as balanced synchronous detectors for deriving the various color difference signals in which case oppositely phased waves of the subcarrier frequency must be provided. Hence for the B—Y synchronous detector waves of 0° and 180° must be provided, for the R—Y detector 90° and 270° waves, and the G—Y detector and 57° waves. These oppositely phased waves lie on what are usually termed color axes, e.g., the 0° and 180° phases are in the B—Y axis, etc. If three synchronous detectors are to be used, the teaching of the prior art would lead to the use of three transformers, and the problems of cost and reliability would still be present.

It is another object of the present invention to provide less expensive means for producing components of a subcarrier wave on each of the three axes for application to the chroma detectors of a color television receiver.

It is a further object of this invention to provide means for producing components of a subcarrier wave on each of three axes that is relatively free from interaction.

Still another object of this invention is to provide improved means for producing components of a subcarrier wave on each of three axes that has a minimum amount of interaction and which is relaitvely inexpensive.

It is another object of this invention to provide an improved low cost, reliable apparatus for producing oppositely phased waves of a subcarrier frequency on each of three axes.

It is another object of this invention to provide an improved apparatus employing only two transformers for producing waves of subcarrier frequency having phases on each of the three axes.

It is another object of this invention to provide an improved apparatus for producing with only two transformers oppositely phased waves of subcarrier frequency on each of three axes.

In general these objectives are attained in accordance with this invention by applying one of the three phases of reconstituted subcarrier wave to the primary winding of one transformer, a second phase to the primary winding of a second transformer, and combining the outputs of windings coupled to the respective primary windings so as to produce a reconstituted subcarrier wave having the third phase. Thus, for example, the 90° or R—Y phase of the reconstituted subcarrier wave could be applied to one primary winding, the 0° or B—Y phase, derived from the 90° phase by a phase shifting means, could be applied to the primary of a second transformer and the 237° phase could be derived by combining the outputs of windings of the respective transformers which are coupled to the respective primary windings. In order to attain the desired output, it is essential that means be provided for deriving the proper relative amplitudes of the two phases of reconstituted subcarrier wave that are to be combined. A preferred means is the proper combination of coupling, winding senses and turns ratio of the windings providing the wave to be combined with respect to the respective primary windings.

The invention will be more clearly understood by considering the following detailed discussion of the drawings in which:

FIGURE 1 indicates the vectoral relationship of the various waves of the NTSC color television system;

Figures 1, 2:
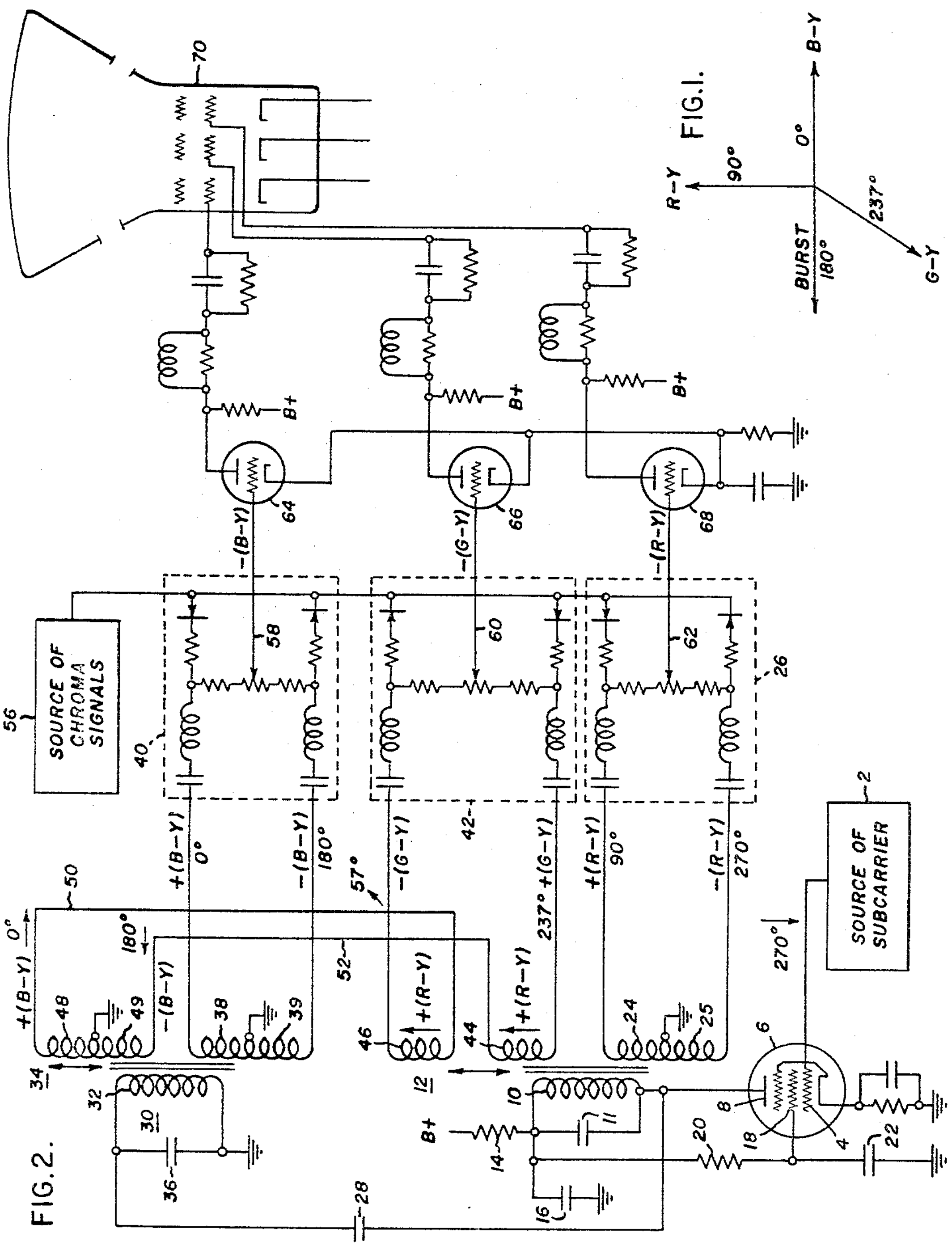
FIGURE 2 is a schematic diagram of circuits embodying one form of the invention.

In FIGURE 1 it can be seen that the bursts of cycles of subcarrier frequency have a phase of 180°, and that the color difference signals B—Y, R—Y and G—Y have the phases of 0°, 90° and 237° respectively. As is well known by those skilled in the art, a synchronous detector wherein the subcarrier is mixed with a chroma signal will produce a positive color difference signal when the phase of the subcarrier is the same as that of the color difference signal and a negative color difference signal when the phase of the subcarrier is opposite to that of the difference signal. Thus mixing of a 0° subcarrier with the chroma signals produces a +(B—Y) and mixing a 180° subcarrier with the chroma signals produces —(B—Y). This reasoning applies to R—Y and G—Y as well.

In FIGURE 2 a source 2 of continuous reconstituted subcarrier wave at a phase of 270° is illustrated in block form. It is well known by those skilled in the art how to derive from the bursts of subcarrier frequency a continuous wave of this frequency at any desired phase, and, therefore, the details of the circuits are not shown. However, one such source is the crystal filter circuit shown in the U.S. Patent No. 2,910,657 assigned to the assignee of this application.

The subcarrier wave from the source 2 is applied to a grid 4 of an amplifier 6. The anode 8 is connected to a source of B+ potential via a primary winding 10 of a transformer 12 and a resistor 14. A capacitor 16 bypasses the lower potential side of the resistor 14 to ground. Operating potential for the screen grid 18 of the amplifier 6 is provided by connecting a resistor 20 and a capacitor 22 in series between the lower potential end of the resistor 14 and ground.

Owing to the phase inversion provided by the amplifier 6, the subcarrier wave appears across the primary winding 10 of the transformer 12 with a phase of 90°, which it will be observed is in phase with the R—Y signal, as indicated in FIGURE 1. A capacitor 11 tunes the primary winding 10 to resonance at the subcarrier frequency. A secondary winding 24, 25 with a grounded center tap is magnetically coupled to the primary winding 10 and provides a wave of subcarrier frequency at the ungrounded end of winding 24 that is in phase with the R—Y signal 90°, and at the ungrounded end of the winding 25 a wave that is out of phase with this signal or at 270°. These oppositely phased waves of subcarrier frequencies are applied to an R—Y synchronous detector illustrated within the dotted rectangle 26.

A capacitor 28 is connected between the anode 8 of the amplifier 6 and the ungrounded end of a parallel resonant circuit 30 which is comprised of a primary winding 32 of a second transformer 34 and a capacitor 36. The capacitance of the capacitor 36 and the inductance of the primary winding 32 are such as to provide a condition of parallel resonance at the frequency of the subcarrier wave. Hence, the voltage across the primary winding 32 will have a phase of 180°. A secondary winding 38, 39 having a grounded center tap is coupled to the primary winding 32 of the transformer 34 so as to provide a wave of subcarrier frequency having 0° phase, i.e., in phase with +(B—Y) signal at the ungrounded end of 38 and at the ungrounded end of 39 a wave of subcarrier frequency having a phase of 180°, and therefore in phase with the —(B—Y) signal. These waves are applied to a synchronous detector shown within the dotted rectangle 40.

The oppositely phased waves of subcarrier frequency which are to be applied to a G—Y synchronous detector indicated within the dotted rectangle 42 are derived in the following manner. Tertiary windings 44 and 46 of the transformer 12 are each coupled to the primary winding 10 of this transformer in such fashion as to produce a wave of subcarrier frequency having a phase of 90° as indicated by the arrows. A tertiary winding 48 is provided in the transformer 34 and is coupled to the primary winding 32 in such manner that the voltage at the upper or ungrounded end of the tertiary winding 48 has a 0° phase. Another tertiary winding 49 is coupled to the primary winding 32 so as to have the opposite phase of 180° at its lower or ungrounded end. The tertiary winding 48 of the transformer 34 is connected in series with the tertiary winding 46 of the transformer 12 by a lead 50 so as that the resultant voltage will be the vectoral summation of a wave of subcarrier frequency having 0° phase and a wave of subcarrier frequency having a 90° phase. The phase, between 0° and 90°, of the resultant voltage is determined by the relative amplitudes of the voltages in the tertiary winding 48 and the tertiary winding 46, and the absolute values of these voltages depends on the ratio of turns between these windings and their respective primary windings as well as the degree of coupling. The polarity of the voltage depends on the relative winding senses. By suitable selection of the turns ratios and the degrees of coupling the resultant voltage can be made to have a phase of 57°, which, as indicated, coincides with —(G—Y).

A subcarrier wave that is in phase with a +(G—Y) component of the signal, i.e. with a phase of 237° is produced by connecting the tertiary winding 49 of the transformer 34 in series with the tertiary winding 44 of the transformer 12 by means of a connection 52. Thus, the subcarrier wave of 180° phase appearing across the tertiary winding 49 is added to the subcarrier wave of 270° appearing across the tertiary winding 44 (actually the opposite of 90° because 52 is connected to the top of 44) and if the relative amplitudes of these differently phased subcarrier waves are properly adjusted by a combination of turns ratio and coupling, a subcarrier wave having a phase of 237° may be produced. It will be seen that this wave is in phase with the +(G—Y) component of the signal. The waves thus derived at 57° and 237° are applied as indicated above to the synchronous detector 42.

The chroma signals transmitted in accordance with the NTSC system are selected from the remainder of the video signal and provided by a source 56 in a manner well known to those skilled in the art. These are applied to the synchronous detectors 40, 42 and 26 in the manner shown so that the output of the synchronous detector 40 appearing at the point 58 is the —(B—Y) component of the signal, the output of the synchronous detector 42 appearing at the point 60 is the —(G—Y) component of the signal and the output of the synchronous detector 26 appearing at the point 62 is the —(R—Y) component of the signal. These color difference signal components are applied to the grids respectively of the chroma difference amplifiers 64, 66 and 68 the oppositely phased outputs of which are applied in a well known manner to the control grids of three different guns in a cathode ray tube 70.

In the circuit shown in FIGURE 2, the amplifier 6 is shown as a means for coupling the source 2 of subcarrier to the primary winding 10 of the transformer 12 as well as to the phase shifting means 28, 30, but it will be apparent to those skilled in the art that other means might be employed and that an amplifier may not even be required if the subcarrier wave from the source 2 has a sufficiently large amplitude.

In this particular circuit the primary windings 10 and 32 are energized with waves of subcarrier frequency that are 90° out of phase with each other, in particular, waves of 90° and 180° respectively, but it will be apparent to one skilled in the art that any phases of two different color axes could be used. However, there is less interaction when the phases differ by 90° as shown, especially if inexpensive tuned circuits are used to introduce the phase shift.

It would also be possible to utilize the type of circuit shown in FIGURE 2 for deriving opposite phases on axes different from those indicated in FIGURE 1. In some cases this might be desirable because of the nature of the synchronous detectors used. Furthermore, at added expense, one or more of the different phases provided can be further altered by phase shifting networks. The change in the axes on which the opposite phases occur can be brought about by providing phase shifting means within the source 2, varying the adjustment of the phase shifting means 28, 30, providing different phase shifting means for 28, 30, or by adjusting the coupling and/or turns ratios of the tertiary windings 44, 46 or 48, 49 to their respective primary windings. It would also be possible to change the third phase by attenuating the output of one of the tertiary windings before it is combined with the output of the other.

Figure 3:
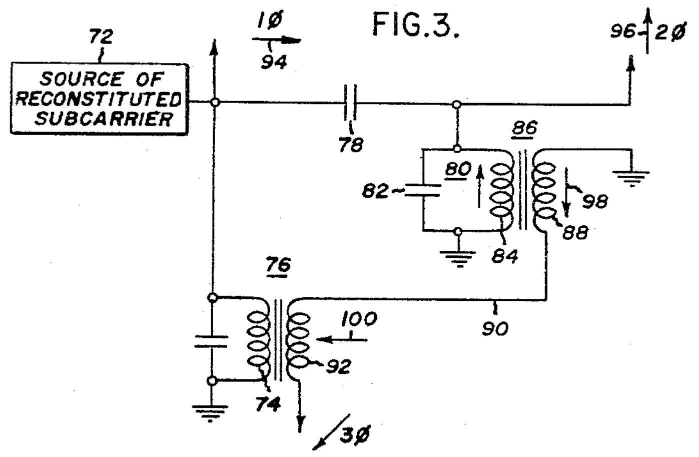
FIGURES 3 and 4 represent embodiments of the invention that can be used with single ended synchronous detectors.

Attention is now directed to FIGURE 3 which illustrates an embodiment of this invention whereby three single phases of the subcarrier wave are derived. Such a circuit would be used in a receiver where the synchronous detectors require only a single phase rather than opposite phases of the subcarrier frequency.

The reconstituted subcarrier is supplied by a source 72, and as will be understood by those skilled in the art, any desired phase can be supplied as the first required phase for application to one synchronous detector. A primary winding 74 of a transformer 76 is connected so as to be energized by the reconstituted subcarrier wave supplied by the source 72. A phase shifting circuit comprised of a capacitor 78 and a parallel resonant circuit 80 are connected in series between the output of the source 72 and a point of reference potential such as ground. If the parallel resonant circuit is turned to the frequency of the subcarrier, the second phase, appearing at the junction of the capacitor 78 and the circuit 80 will be shifted by 90° from the phase of the subcarrier at the output of the source 72.

The parallel circuit 80 is shown as being comprised of a capacitor 82, and an inductance 84, the latter being the primary winding of a transformer 86. The secondary winding 88 has one end connected to a point of reference potential such as ground and the other end is connected by a lead 90 to one end of a secondary winding 92 of the transformer 76. The third phase of the reconstituted subcarrier wave appears at the other end of the winding 92.

In the particular example shown, the operation is as follows. A vector 94 indicates thta the output of the source 72 is at 0°, the first phase, and if the parallel circuit 80 is resonant at the frequency of the subcarrier, the second phase will appear at 90° as indicated by the vector 96. By using a suitable winding sense, or by grounding the proper end, the voltage of subcarrier frequency appearing across the secondary winding 88 can be made to have a phase of 270° as shown by the vector 98. The winding sense of the secondary winding 92 is such that the voltage from its top to its bottom has a phase of 180° as shown by the vector 100. Now if the degree of coupling and the turns ratios of the secondary windings 88 and 92 to their respective primary windings 84 and 74 are properly selected, the third phase of the subcarrier wave appearing at the end of the secondary winding 92 that is remote from ground can be made to have a phase of 237°. It will be apparent to those skilled in the art that other phases than the particular ones illustrated could be derived by the general type of circuit shown in FIGURE 3. The first phase could be set at any angle by use of a phase shifting network in the source 72, the second phase could be displaced from the first by any desired amount by use of a suitable phase shifting network, and the third phase could be set at any desired angle by suitable selection of winding sense, turns ratio and degree of coupling.

Figure 4:
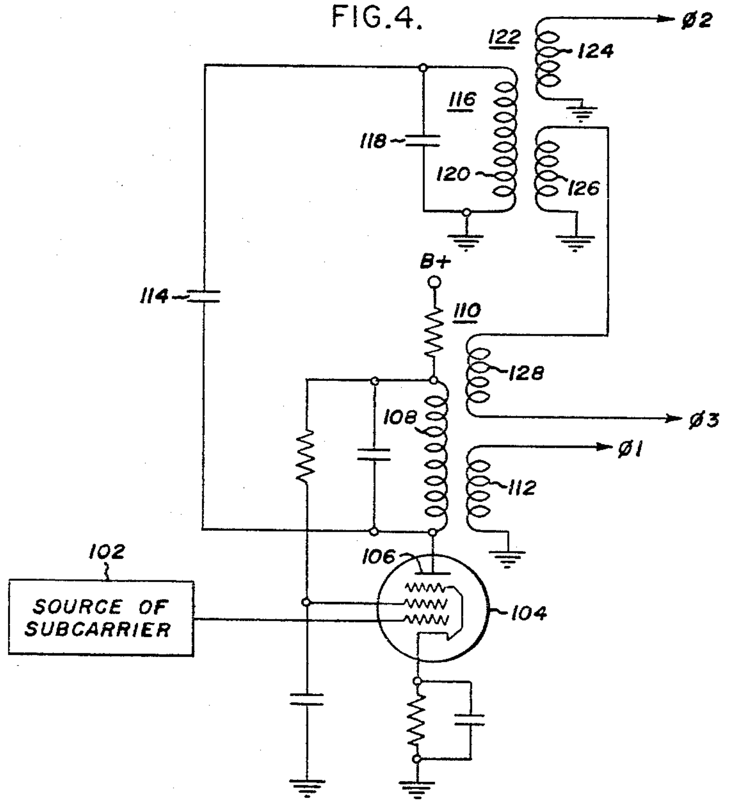

The circuit of FIGURE 4 is similar to that of FIGURE 3 in that three single phases of the reconstituted subcarrier wave are produced. However, it is like the circuit of FIGURE 2 in that the first and second phases are derived from transformer secondary windings. In fact the circuit of FIGURE 4 is like that of FIGURE 2 except that it has one-half the number of secondary and tertiary windings.

In this circuit a source 102 supplies any desired phase of the reconstituted subcarrier wave, e.g., 270°. The amplifier 104 inverts the phase so as to supply at its anode 106 a phase of 90°. A primary winding 108 of a transformer 110 is coupled to the anode 106, and a secondary winding 112 is coupled to the primary winding 108 so as to supply a first phase $\phi 1$ of 90° at its ungrounded end.

A capacitor 114 and a parallel network 116 are connected in series between a point of reference potential such as ground and the anode 106. The parallel network 116 is comprised of a capacitor 118 and a primary winding 120 of a transformer 122. As in FIGURE 2, if this network is tuned to resonance at the frequency of the subcarrier, the current through the primary winding 120 is shifted by 90° to a phase, $\phi 2$, of 180°. A secondary winding 124 provides a phase $\phi 2$ of 0°. A tertiary winding 126 is connected in series with a tertiary winding 128 of the transformer 110 in the manner shown so as to derive the third phase $\phi 3$.

Figure 5:
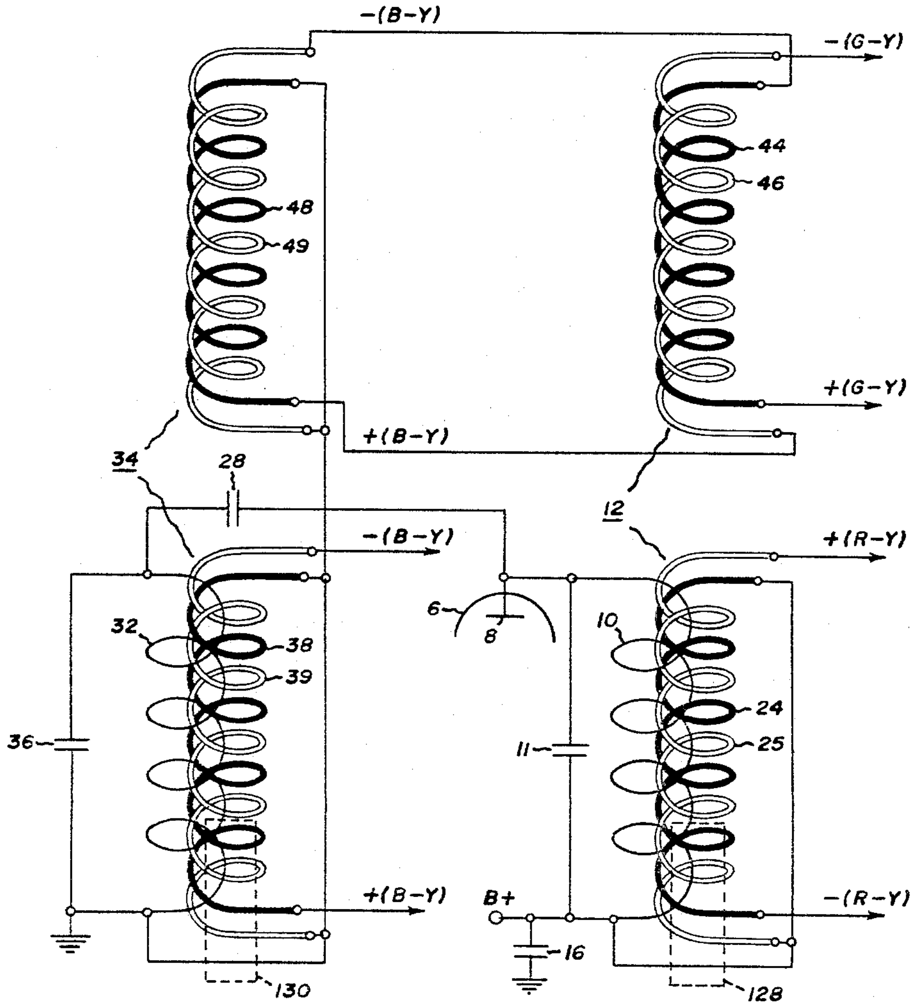
FIGURE 5 illustrates the coil structure of the transformers.
Figure 6:
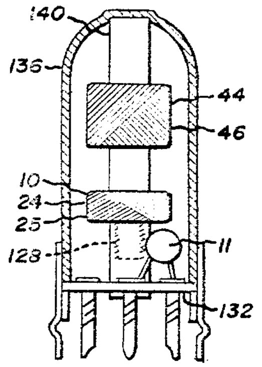
FIGURES 6 and 7 show the transformer assembly.
Figure 7:
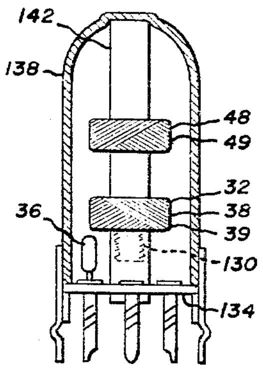

Reference is now made to FIGURES 5–7 for a description of one form of structure of the transformers 12 and 34 of FIGURE 2.

FIGURE 5 is a schematic diagram of the electrical and physical relationships of the various windings of the transformers when bifilar windings are used. The windings could, of course, be center tapped as shown in FIGURE 2, but as is well known, bifilar windings aid in obtaining precisely equal voltages. In order to simplify the drawings, the number of turns shown are fewer than actually used. The size wire for all windings in one operative embodiment was No. 36 and the insulation is comprised of single polyurethane double acetate fiber. The primary winding 10, comprised of 66 plus or minus 1 turns, is wound over the bifilar wound halves 24, 25 of the secondary winding in a counterlockwise direction, as viewed from the top of the drawing. Each of 24, 25 has 14 turns and each of the bifilar tertiary windings, 44 and 46, has 135±2 turns. In this particular embodiment of the invention, the spacing between the nearer turns of the primary winding 10 and the tertiary windings 44, 46 is 0.2″±0.03″.

It will be noted that the flux produced by the −(G−Y) current flowing in the tertiary winding 46 adds to the flux produced by the +(G−Y) current flowing in the tertiary winding 44, and that some of this flux links the secondary windings 24, 25 thus inducing therein a voltage of either +(G−Y) or −(G−Y) phase. This causes the +(R−Y) and −(R−Y) phases produced by the secondary windings 24, 25 to be shifted. However, the spacing referred to above is sufficient, considering the various turns ratios employed, to reduce this induced voltage to a point where the phase error it causes produces no harmful results in the operation of the receiver.

The primary winding 10 is tuned by axially positioning a slug 128 of magnetic material that threads into a coil form which is not shown. The slug 128 is shorter than the axial length of the primary winding 10, and it could be inserted at either end, but it is preferable that it be inserted at the end remote from the tertiary windings in order to prevent the coupling between the primary winding 10 and the tertiary windings 44, 46 from being varied as the slug is moved for tuning.

The transformer 34 is comprised of a primary winding 32, having 69±1 turns, wound over bifilar wound secondary windings 38, 39 each of which has 14 turns. The bifilar wound tertiary windings 48, 49 each have 84±2 turns and are spaced from the other windings by 0.060"+.005"−0.010". A slug 130, of magnetic material is threaded into the lower end of the coil form (not shown) on which the windings are mounted. It will be noted that the flux produced by the R—L current flowing in coil 48 resulting from its connection to the coil 46 tends to be cancelled by the flux produced by the R—Y current flowing in coil 49 resulting from its connection to the coil 44, so that contamination of the +(B—Y) and −(B—Y) voltages produced at 38 and 39 is minimized. Hence the coil spacing last referred to is primarily determined by the desired voltage amplitudes.

FIGURES 6 and 7 show the physical relationship between the various parts of the transformers 12 and 34 respectively. The outer diameter of the respective coil forms 140 and 142 is .283", and they are held in place at one end by the respective metal covers 136, 138 and at the other end by the bases 132, 134. The spacings between the coils which have previously been noted as well as the spacings between the lower coils and the bases are shown in the drawings. The capacitors 11 and 36 may be mounted, as shown, to the respective bases and are electrically connected to the proper leads.

In an actual operating circuit, the voltage across the primary windings 10, 32 were each 300 volts, across the secondary windings 24, 25, 38, 39, 40 volts across the tertiary windings 44, 46, 25 volts, across the tertiary windings 48, 49, 16 volts, and the +(G—Y) and −(G—Y) voltages were 30 volts. Vertical addition of the 16 and 25 volt of B—Y and R—Y produced in the windings 44, 46 yields a voltage of approximately 30 volts at the desired angles for +(G—Y) and −(G—Y). The voltages do not correspond to the turns ratios because of lack of loading effects and lack of unity coupling.

It will readily be appreciated by those skilled in the art that the number of turns of the various windings, the spacings and the degree of magnetic coupling could be altered and still obtain the same results. It will also be appreciated that the amplitudes of the various phases may not be the same and that the smallest need only be at least twice the maximum amplitude of the chroma signals.

Although the apparatus has been described for deriving particular phases of the subcarrier, it will be understood that it can be adapted for producing different phases, but if so, the color information derived will still approximate the information associated with the particular phases chosen.

While the invention has been described in specific embodiments, it will be appreciated that many modifications may be made by those skilled in the art and we intend by the appended claims to cover all such modifications and changes as fall within the true spirit and scope of the invention.

What I claim as new and desire to secure by Letters Patent of the United States is:

1. In a color television receiver for operation in response to a composite signal including a chroma signal having a first color information represented by the sidebands only of a first phase of a carrier wave, a second color information represented by the sidebands only of a second phase of the carrier wave, a third color information represented by the sidebands only of a third phase of the carrier wave and wherein three synchronous detectors are used to derive signals in response to said chroma signal and a phase of the carrier wave, each signal at least approximately, corresponding to a different one of said first, second and third color information, apparatus for providing the three different phases of said carrier wave from a single phase thereof for application to said synchronous detectors comprising a first transformer having a primary winding, a secondary winding and a tertiary winding, means establishing one end of said secondary winding at a reference potential for the frequency of the carrier wave, a second transformer having a primary winding, a secondary winding and a tertiary winding, means establishing one end of said latter secondary winding at a reference potential for the frequency of said carrier wave, means establishing one end of said latter tertiary winding at a reference potential for the frequency of said carrier wave, means coupling the other end of said latter tertiary winding to one end of the tertiary winding of said first transformer and means for energizing said primary windings with different phases of the carrier wave when a particular phase is applied thereto, under which condition a first phase of said carrier wave appears at the end of said secondary winding of said first transformers that is opposite to the end coupled to said reference potential, a second phase of said carrier wave appears at the end of said secondary winding of said second transformer that is remote from the end that is coupled to the reference potential and a third phase of said carrier wave appears at the end of said tertiary winding of said first transformer that is remote from the end that is coupled to one end of the tertiary winding of said second transformer.

2. In a color television receiver for operation in response to a composite signal including a chroma signal having a first color information represented by the sidebands only of a first phase of a carrier wave, a second color information represented by the sidebands only of a second phase of the carrier wave, a third color information represented by the sidebands only of a third phase of the carrier wave and wherein three synchronous detectors are used to derive signals in response to said chroma signal and a phase of the carrier wave, each signal at least approximately, corresponding to a different one of said first, second and third color information, apparatus for providing the three different phases of said carrier wave from a single phase thereof for application to said synchronous detectors comprising a first transformer having a primary winding, a secondary winding and a tertiary winding, means establishing one end of said secondary winding at a reference potential for the frequency of the carrier wave, a scond transformer having a primary winding, a secondary winding and a tertiary winding, means establishing one end of said latter secondary winding at a reference potential for the frequency of said carrier wave, means establishing one end of said latter tertiary winding at a reference potential for the frequency of said carrier wave, means coupling the other end of said latter tertiary winding to one end of the tertiary winding of said first transformer, means establishing one end of the primary winding of said first transformer at a reference potential for the frequency of said carrier wave, a reactive impedance connected between the other end of said primary winding to one end of the primary winding of said second transformer, means establishing the other end of said latter primary winding at a reference potential.

3. In a color television receiver for operation in response to a composite signal including a chroma signal having a first color information represented by the sidebands only of a first phase of a carrier wave, a second color information represented by the sidebands only of a second phase of the carrier wave, a third color information represented by the sidebands only of a third phase of the carrier wave and wherein three synchronous detectors are used to derive signals in response to said chroma signal and a phase of the carrier wave, each signal at least approximately, corresponding to a different one of said first, second and third color information, a source of continuous carrier frequency of a given phase, a first transformer having a primary winding, first and second secondary windings and first and second tertiary windings, a second transformer having a primary winding, first and second secondary windings and first and second tertiary windings, a first capacitor coupled across at least a portion of said primary winding of said first transformer, said capacitor having such capacitance as to tune said primary winding to resonance at the carrier frequency, a second capacitor coupled across at least a portion of the primary winding of said second transformer, said second capacitor having such capacitance as to tune the latter primary winding to resonance at the carrier frequency, means for establishing one end of said primary winding of said first transformer at a reference potential for the frequency of said subcarrier, means for coupling the other end to said source of continuous carrier frequency, means coupling one end of the primary winding of said second transformer at said reference potential for the carrier frequency, a third capacitor coupled between other ends of said first primary windings and the end of said primary winding of said second transformer that it remote from the end that is established at a reference frequency, whereby the phases of the currents of carrier frequency flowing in said primary windings differs by 90°, means for establishing one end of each of said first and second secondary windings of said first and second transformers and one end of said tertiary windings of said second transformer at a reference potential for the carrier frequency means coupling the other end of said first tertiary winding of said second transformer to one end of said first tertiary winding of said first transformer, and means coupling the other end of said second tertiary winding of said second transformer to one end of said second tertiary winding of said first transformer.

References Cited

UNITED STATES PATENTS 2,951,897 9/1960 Loughlin.

ROBERT L. GRIFFIN, *Primary Examiner.*

R. MURRAY, *Assistant Examiner.*